United States Patent
Asami et al.

(10) Patent No.: US 8,188,406 B2
(45) Date of Patent: May 29, 2012

(54) STEERING WHEEL PLANAR HEAT GENERATING ELEMENT

(75) Inventors: Naohito Asami, Nara (JP); Yoshitaka Morikawa, Mie (JP); Takehiko Shigeoka, Nara (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 12/295,224

(22) PCT Filed: Mar. 6, 2007

(86) PCT No.: PCT/JP2007/054353
§ 371 (c)(1),
(2), (4) Date: Sep. 29, 2008

(87) PCT Pub. No.: WO2007/122881
PCT Pub. Date: Nov. 1, 2007

(65) Prior Publication Data
US 2009/0308857 A1 Dec. 17, 2009

(30) Foreign Application Priority Data

Mar. 30, 2006 (JP) ................................. 2006-094018
Jan. 22, 2007 (JP) ................................. 2007-011010

(51) Int. Cl.
*B60L 1/02* (2006.01)
*B62D 1/04* (2006.01)

(52) U.S. Cl. ........ 219/202; 219/528; 219/529; 219/204; 219/548; 219/549; 219/552; 219/553; 219/206; 219/207; 219/209; 74/552; 74/557; 74/558

(58) Field of Classification Search .................. 219/202, 219/204, 528–9, 548–9, 552–3, 206–7, 209; 74/552, 557, 558
See application file for complete search history.

(56) References Cited

U.S. PATENT DOCUMENTS 3,971,361 A 7/1976 Hurko
(Continued)

FOREIGN PATENT DOCUMENTS

DE 8617528 U1 8/1986
(Continued)

OTHER PUBLICATIONS

Russian Decision on Grant Patent for Invention dated Mar. 17, 2010.
(Continued)

*Primary Examiner* — Shawntina Fuqua
(74) *Attorney, Agent, or Firm* — Pearne & Gordon LLP

(57) ABSTRACT

The invention relates to a planar heat generating element for use on steering wheels of automotive vehicles and motorboats, and a problem of the invention is to adjust a temperature portion of a planar heat generating element which is attached to a steering wheel, so as to enhance the sensation of using the steering wheel by the user when he or she grips thereon.

In the invention, since linear heaters (17) of a planar heat generating element (14) are provided so as to be turned repeatedly along a circumferential direction and such that the density of turns of the liner heaters (17) at an outermost circumferential portion of a ring portion (12) becomes sparse, the temperature of the outermost circumferential portion of the ring portion (12) with which the palms of the user are brought into contact when he or she grips the ring portion (12) can be made to be adjusted, and the heat generation of the planar heat generating element (14) can be adjusted so as to match the user's way of gripping, thereby the sensation of using the steering wheel felt by the user when he or she grips thereon being able to be enhanced.

4 Claims, 6 Drawing Sheets

U.S. PATENT DOCUMENTS

| | | | |
|---|---|---|---|
| 4,631,976 A * | 12/1986 | Noda et al. | 74/552 |
| 6,727,467 B1 * | 4/2004 | Hadzizukic et al. | 219/204 |
| 2002/0033389 A1 | 3/2002 | Sugiyama et al. | |
| 2002/0179595 A1 | 12/2002 | Nagele | |

FOREIGN PATENT DOCUMENTS

| | | |
|---|---|---|
| JP | 60-102169 | 7/1985 |
| JP | 04-015162 | 1/1992 |
| JP | 2002-96740 | 4/2002 |
| JP | 2003-123947 | 4/2003 |
| RU | 2 119 729 C1 | 9/1998 |

OTHER PUBLICATIONS

International Search Report for PCT/JP2007/054353; Mar. 22, 2007.
European Search Report for PCT/JP2007/054353 dated Jul. 18, 2011.

* cited by examiner

STEERING WHEEL PLANAR HEAT GENERATING ELEMENT

TECHNICAL FIELD

The present invention relates to a planar heat generating element for use for steering wheels of automotive vehicles or motorboats.

BACKGROUND ART

Conventionally, as this type of steering wheel planar heat generating element for automotive vehicles or motorboats, there have been many planar heat generating elements in which a heating heater which generates heat by being connected to a power supply is held in place between a substrate of a steering wheel and a covering material which is provided with a sheet, synthetic resin, fabric product or, in particular, leather (for example, refer to Patent Document No. 1).

FIG. 6 shows a conventional steering wheel and FIG. 7 shows a plan view of a conventional steering wheel planar heat generating element. As is shown in FIGS. 6 and 7, 1 denotes a planar heat generating element, 2 a heater which is provided with a warp knitted fabric which can be elongated, 3 a woven fabric of textile fibers which fringes the heater along a joint edge portion, and 4 a connecting line which extends over the overall width of the warp knitted fabric 2 to connect a power supply with the heater 2, and the planar heat generating element 1 is bonded to a covering material 5 for a steering wheel. The planar heat generating element 1 bonded to the covering material 5 is then attached to a steering wheel provided with a ring portion and spoke portions for use.

Patent Document No. 1: JP-A-4-15162

DISCLOSURE OF THE INVENTION

Problem that the Invention is to Solve

However, in the conventional configuration that is described above, since a heating portion of the planar heat generating element 1 becomes uniform when the planar heat generating element 1 is attached to a steering wheel 6, there has been a problem that a temperature distribution occurring on the planar heat generating element 1 so attached when it is heated does not coincide with the sensation of the user.

For example, when the user grips the steering wheel 6, warmness is felt differently at the finger tips and the palms and the user feels warmer at the palms than at the finger tips. In addition, when the user grips the ring portion 7 of the steering wheel 6, the user feels it difficult to grip the ring portion 7 in positions where spoke portions are situated, and since the user changes the way he or she grips the ring portion 7 in those positions, the way the user feels warmness changes, and furthermore, even though the heat is generated uniformly on the planar heat generating element 1 attached to the steering wheel 6, since heat conduction or heat dissipation is not even and hence the heating state is not even depending on positions on the steering wheel 6, the sensation of warmness felt by the user when he or she grips the steering wheel 6 changes.

In particular, the way of gripping of the steering wheel 6 and the heat conduction or heat dissipation change or become different between portions on the ring portion 7 of the steering wheel 6 which lie in the positions where the spoke portions 8 are situated and the other portions, and since the way of gripping is disturbed by the spoke portions 8, although the finger tips are allowed to contact closely the ring portion 7, the palms are difficult to contact it closely, and since heat generated by the planar heat generating element 1 is thermally conducted to the spoke portions 8, the temperature is difficult to be increased in those portions. On the contrary, since the ring portion 7 is easy to be gripped at the other portions of the ring portion 7 of the steering wheel 6 where the spoke portions 8 are not positioned, the palms are easy to contact closely the ring portion 7, and since the spoke portions 8 are not present at the other portions, the other portions have a tendency that temperature is easy to be increased.

Consequently, in the event that the heat generating portion of the planar heat generating element 1 is uniform, the sensation of warmness felt by the user when he or she grips the steering wheel 6 becomes different between the portions on the ring portion of the steering wheel 6 where the spoke portions 8 are positioned and the other portions, and as a result, in the event that it is set such that the temperature at the portions on the ring portion 7 of the steering wheel 6 where the spoke portions 8 are positioned becomes appropriate, the other portions where the spoke portions 8 are not positioned become too warm, and the user feels too warm at the portions of the ring portion 7 where the palms contact, that is, an outermost circumferential portion of the ring portion 7, there having been a concern that there would be caused a problem with gripping the steering wheel 6.

The invention has been made with a view to solving the conventional problem and an object thereof is to enhance the sensation of using the steering wheel 6 felt by the user when he or she grips thereon by adjusting the temperature portion or heat generating portion of the planar heat generating element attached to the steering wheel 6.

Means for Solving the Problem

With a view to solving the conventional problem, according to the invention, there is provided a steering wheel planar heat generating element comprising:

a steering wheel provided with a ring portion having a grip portion and a spoke portion connected to a steering shaft, a planar heat generating element disposed at least on the grip portion in the ring portion including a substrate and a linear heater disposed on the substrate, and a covering material to cover the planar heat generating element, wherein the linear heater of the planar heat generating element is disposed so as to be turned repeatedly along a circumferential direction of the ring portion, and the linear heater is disposed such that a density of turns of the linear heater becomes sparse at an outermost circumferential portion of the ring portion.

According to the configuration described above, since the linear heaters of the planar heat generating element are disposed so as to be turned repeatedly along the circumferential direction of the ring portion and such that the density of turns of the linear heaters at the outermost circumferential portion of the ring portion becomes sparse, the temperature at the outermost circumferential portion of the ring portion with which the palms of the user are brought into contact when he or she grips the ring portion can be made to be adjusted, and this enables an adjustment of heat generation on the planar heat generating element, thereby making it possible to enhance the sensation of using the steering wheel felt by the user when he or she grips thereon.

In addition, since the linear heaters of the heat generating portion are turned repeatedly along the circumferential direction to make up the heat generating portion, the curvature of the linear heaters is increased, and the linear heaters are made difficult to stand out to a surface of the covering material disposed to cover the planar heat generating element by such an extent that the curvature is increased, thereby making it possible to enhance the touching feeling and external appearance of the steering wheel.

ADVANTAGE OF THE INVENTION

In the planar heat generating element of the invention, since the temperature of the outermost circumferential portion of the ring portion with which the palms of the user are brought into contact when he or she grips the steering wheel can be made to be adjusted, the heat generation of the planar heat generating element can be adjusted so as to match the user's way of gripping, thereby making it possible to enhance the sensation of using the steering wheel felt by the user when he or she grips thereon.

Figure 1:
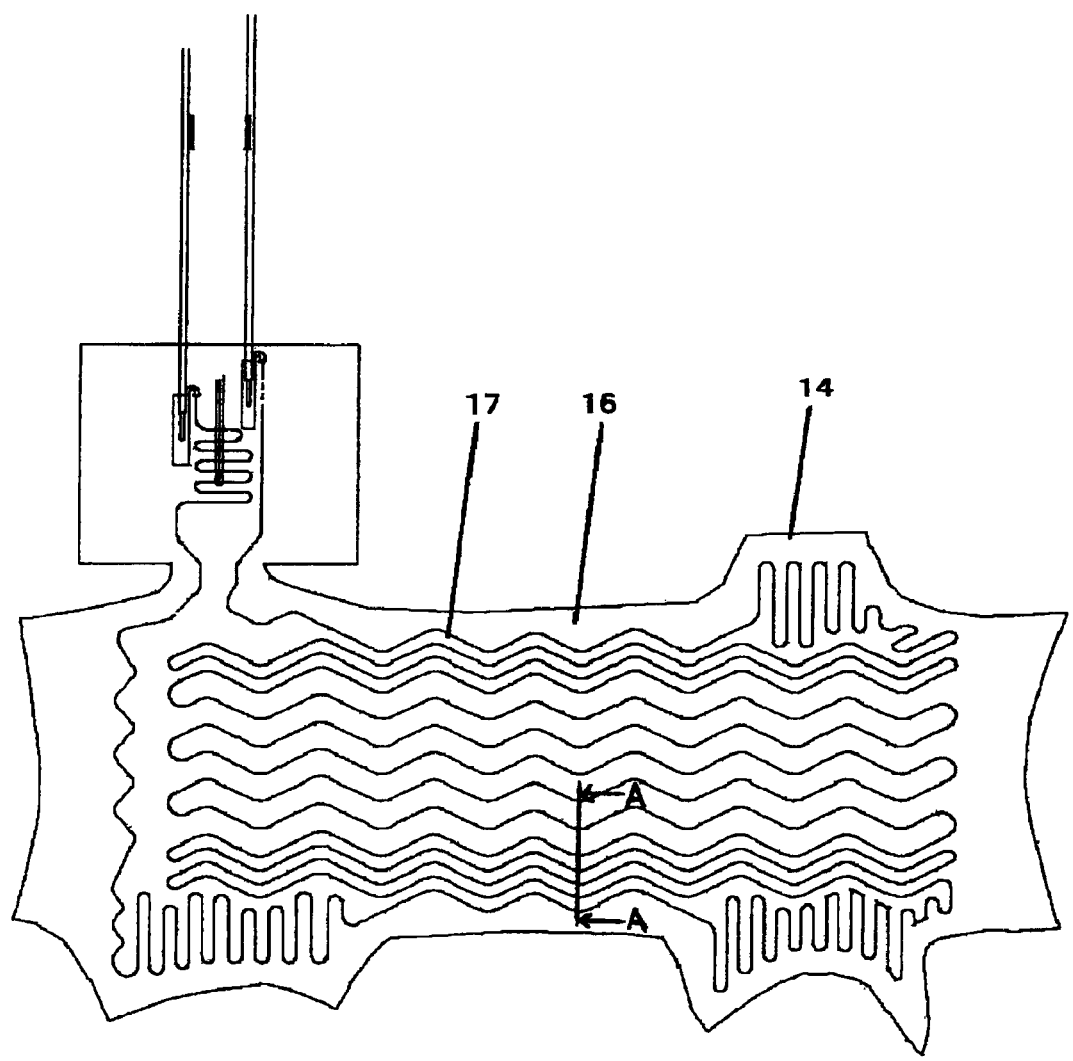
FIG. 1 is a plan view of a planar heat generating element according to Embodiment 1 of the invention.

DESCRIPTION OF REFERENCE NUMERALS 11 steering wheel; 12 ring portion; 13 spoke portion; 14 planar heat generating element; 15 covering material; 16 substrate; 17 linear heater

BEST MODE FOR CARRYING OUT THE INVENTION

A first invention provides a steering wheel planar heat generating element including a steering wheel which is provided with a ring portion having a grip portion and spoke portions which are connected to a steering shaft, planar heat generating elements disposed on the grip portion and is provided with a substrate and linear heaters disposed on the substrate, and a covering material disposed to cover the planar heat generating elements, wherein the linear heaters of the planar heat generating element are disposed so as to be turned repeatedly along a circumferential direction of the ring portion, and wherein the linear heaters are disposed such that the density of turns of the linear heaters at an outermost circumferential portion of the ring portion becomes sparse.

In addition, since the linear heaters of the planar heat generating element are disposed so as to be turned repeatedly along the circumferential direction of the ring portion and the linear heaters are disposed such that the density of turns of the linear heaters at the outermost circumferential portion of the ring portion becomes sparse, the temperature at the outermost circumferential portion of the ring portion with which the palms of the user are brought into contact when the user grips the ring portion can be adjusted, and the heat generation of the planar heat generating element can be adjusted so as to match the user's way of gripping, thereby making it possible to enhance the sensation of using the steering wheel felt by the user when he or she grips thereon.

In addition, since the linear heaters of the heat generating portion are turned repeatedly along the circumferential direction to make up the heat generating portion, the curvature of the linear heaters is increased, and the linear heaters are made difficult to stand out to a surface of the covering material disposed to cover the planar heat generating element by such an extent that the curvature is increased, thereby making it possible to enhance the touching feeling and external appearance of the steering wheel.

A second invention provides a configuration in which the outermost circumferential portion of the ring portion is disposed so as to be positioned substantially in a center of, in particular, the planar heat generating element of the first invention when the planar heat generating element is unrolled to spread and the density of turns of the linear heaters which are positioned substantially in the center of the planar heat generating element becomes sparse.

In addition, since the outermost circumferential portion of the ring portion is made to be positioned substantially in the center of the planar heat generating element when it is unrolled to spread, wrinkles and/or overlaps which are easy to be produced at end portions of the planar heat generating element attached to the ring portion and stepped conditions produced by a difference in level between a portion where the substrate is present and a portion where the substrate is not present are prevented from being positioned at the outermost circumferential portion of the ring portion which becomes most visible and which is felt easily by the user when he or she touches the ring portion, a concern is eliminated that the external appearance and touching feeling are deteriorated.

In addition, since the density of turns of the linear heaters which are positioned substantially in the center of the planar heat generating element becomes sparse, the temperature at the outermost circumferential portion of the ring portion with which the palms of the user are brought into contact when he or she grips the ring portion can be made to be adjusted, and the heat generation of the planar heat generating element can be adjusted so as to match the user's way of gripping, thereby making it possible to enhance the sensation of using the steering wheel felt by the user when he or she grips thereon. In addition, since the density of linear heaters is made sparse at the outermost circumferential portion of the ring portion, the concern that the external appearance and touching feeling are deteriorated is eliminated further.

A third invention is such that a turning pitch of the linear heater of, in particular, the planar heat generating element of the first invention is made to change gradually from the outermost circumferential portion towards an innermost circumferential portion of the ring portion and that the pitch at the outermost circumferential portion of the ring portion is made largest and the pitch at the innermost circumferential portion is made smallest.

In addition, by making the pitch at the outermost circumferential portion of the ring portion with which more portions of the hands of the user are brought into contact largest and making the pitch at the innermost circumferential portion with which fewer portions of the hands of the user are brought into contact smallest, the sensation of warmness felt by the user can be made more uniform.

Additionally, since the heaters become dense at the innermost circumferential portion with which the finger tips are brought into contact, the heating amount becomes larger than at the portions with which the palms are brought into contact, thereby making it possible to enhance comfortableness.

A fourth invention is configured such that the linear heaters of, in particular, the planar heat generating element according to the first to third inventions are disposed so as to be turned repeatedly along the circumferential direction of the ring portion and that the linear heaters are laid out in a substantially wavy manner.

In addition, although when the planar heat generating element is assembled to the ring portion, the planar heat generating element is assembled to the ring portion while being slightly stretched so as not to generate wrinkles and/or looseness on the surface of the covering material, since the linear heaters of the planar heat generating element are disposed so as to be turned repeatedly along the circumferential direction of the ring portion and the linear heaters are laid out in the substantially wavy manner, the curvature of the linear heaters is increased, and the linear heaters are made difficult to stand out to the surface of the covering material which is disposed to cover the planar heat generating element by such an extent that the curvature is increased, thereby making it possible to enhance the touching feeling and external appearance. In addition, when stretching the planar heat generating element, the substantially wavy portions of the linear heaters follow the stretching of the planar heat generating element, and a concern that the linear heaters are damaged by such stretching is eliminated by such an extent that the substantially wavy portions follow the stretching of the planar heat generating element.

Hereinafter, embodiments of the invention will be described by reference to the drawings. Note that the invention is not limited by embodiments that will be described below.

(Embodiment 1)

Figure 2:
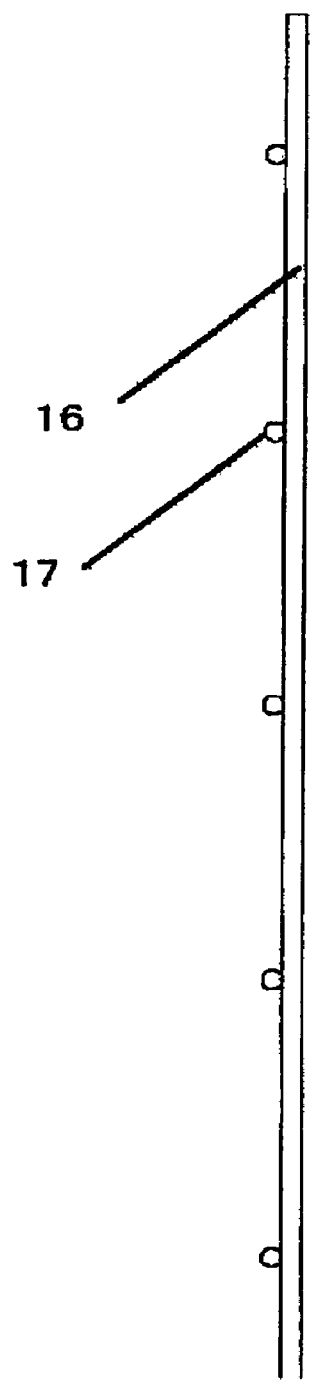
FIG. 2 is a sectional view of the same planar heat generating element.
Figure 3:
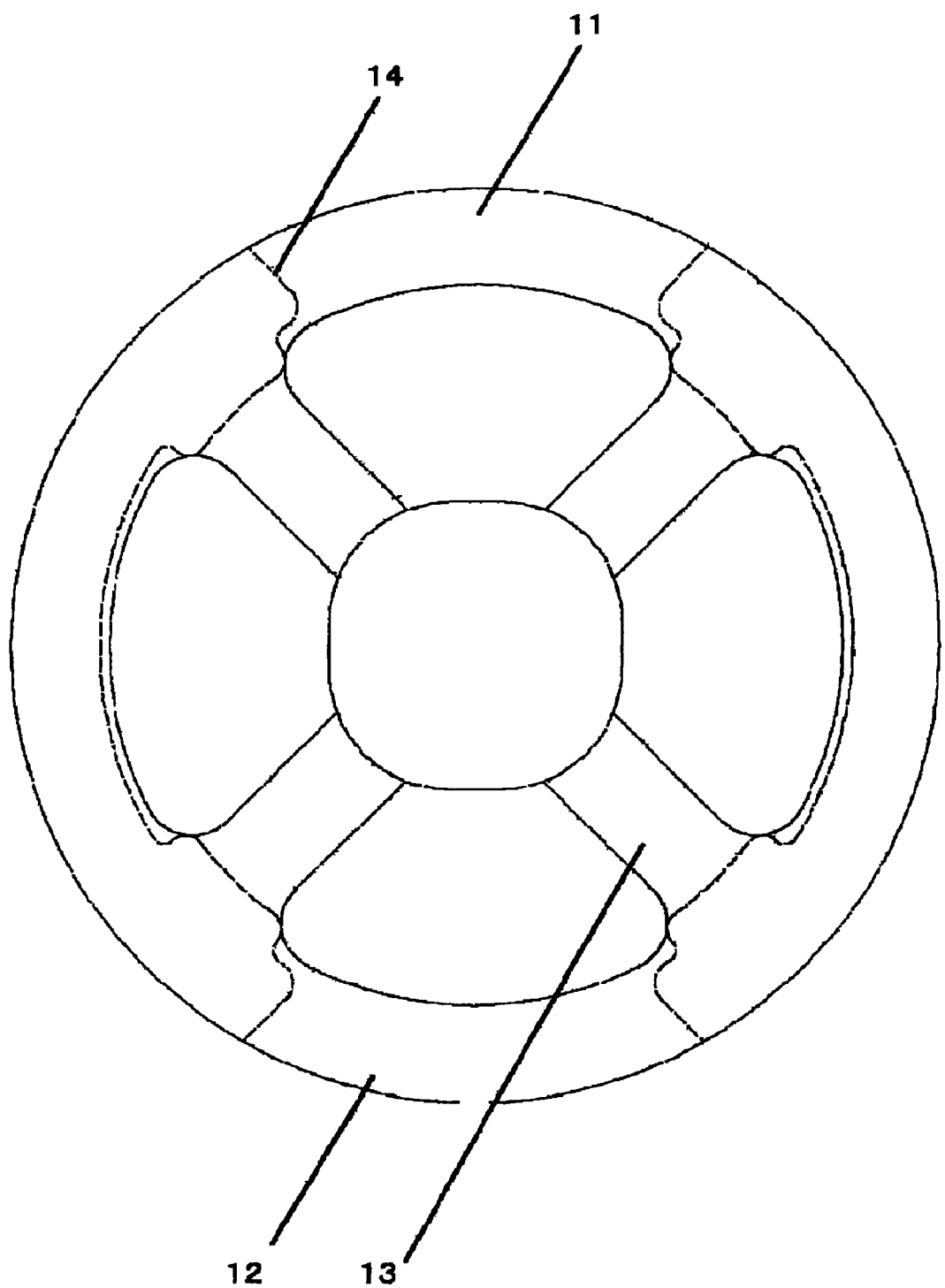
FIG. 3 is a plan view of a steering wheel according to Embodiment 1 of the invention.
Figure 4:
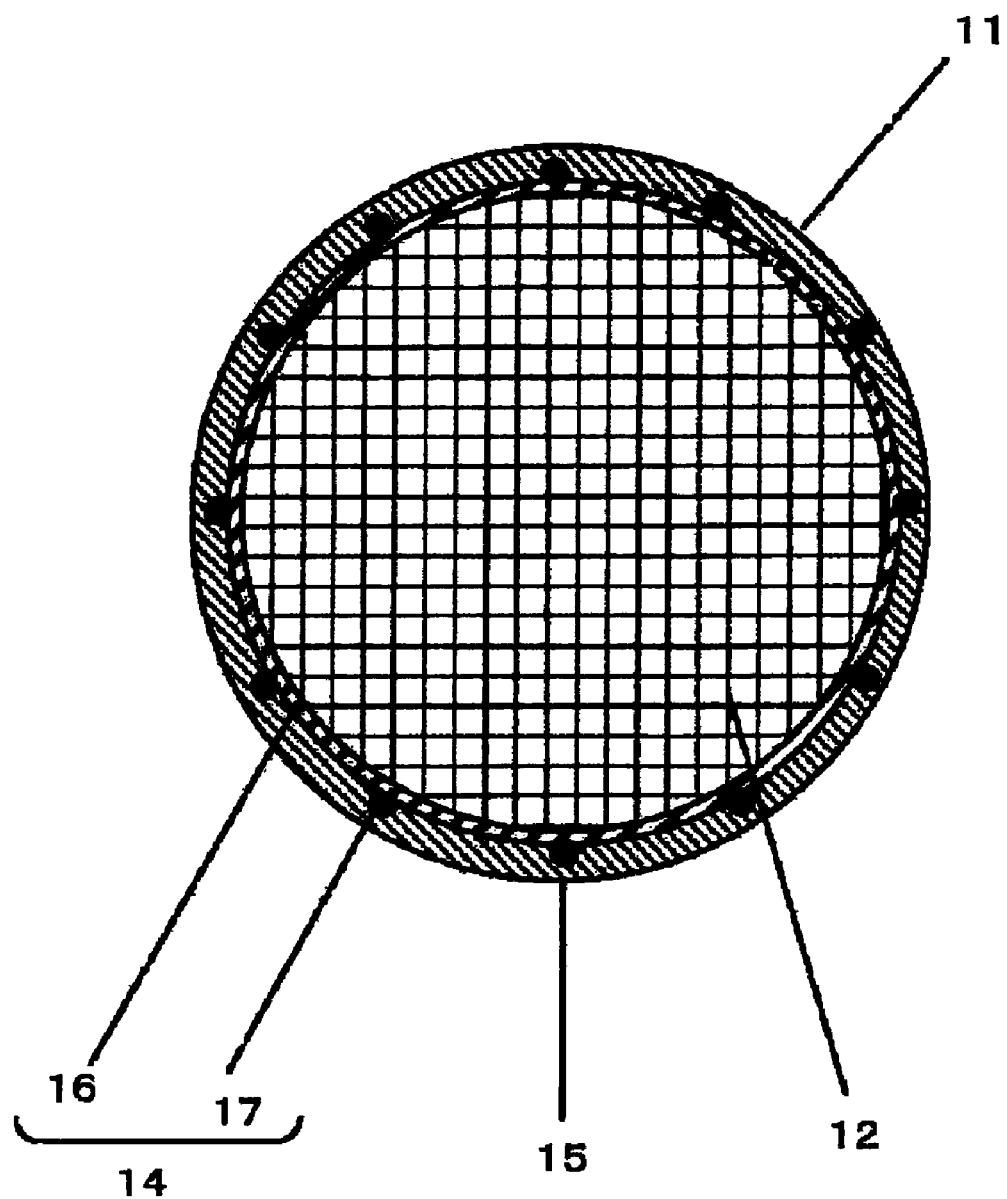
FIG. 4 is a sectional view of a main part according to Embodiment 1 of the invention of the steering wheel.

FIG. 1 is a plan view of a steering wheel planar heat generating element according to Embodiment 1 of the invention, FIG. 2 is a sectional view taken along a portion A-A in FIG. 1, FIG. 3 is a plan view of a steering wheel to which the steering wheel planar heat generating element is attached, and FIG. 4 is a sectional view of a main part of the steering wheel.

In FIGS. 1 to 4, a steering wheel 11 is provided with a ring portion 12 which has gripping portions and spoke portions 13 which are connected to a steering shaft (not shown), and the spoke portions 13 are provided two on each side of a center of the ring portion 12 substantially symmetrically and spaced apart in a left and right direction with respect to the center of the ring portion 12. A planar heat generating element 14 is disposed on the ring portion 12 substantially symmetrically in the left and right direction so as to extend between vicinities of the ring portion 12 to which the two pairs of spoke portions 13 disposed substantially symmetrically and spaced apart in the left and right direction are connected to the ring portion 12, and a covering material 15 is disposed to cover the planar heat generating element 14.

This planar heat generating element 14 is disposed with a substrate 16 of a nonwoven fabric and a linear heater 17 disposed on the substrate 16, and when the planar heat generating element 14 is attached to the ring portion 12, the linear heater 17 is turned repeatedly along a circumferential direction to thereby form a heat generating portion. In addition, when the planar heat generating element 14 is unrolled to spread, an outermost circumferential portion of the ring portion 12 is disposed to be positioned substantially in a center of the planar heat generating element 14, and the density of turns of the linear heaters 17 which are positioned substantially in the center of the planar heat generating element 14 is made to be sparse.

Here, since the outermost portion of the ring portion 12 is disposed to be positioned substantially in the center of the planar heat generating element 14 when it is unrolled to spread, wrinkles and/or overlaps which are easy to be produced at end portions of the planar heat generating element 14 attached to the ring portion 2 and stepped conditions produced by a difference in level between a portion where the substrate is present and a portion where the substrate is not present are prevented from being positioned at the outermost circumferential portion of the ring portion 12 which becomes most visible and which is felt easily by the user when he or she touches the ring portion 12, a concern is eliminated that the external appearance and touching feeling are deteriorated.

In addition, since the density of turns of the linear heater 17 which is positioned substantially in the center of the planar heat generating element 14 becomes sparse, the temperature at the outermost circumferential portion of the ring portion 12 to which the palms of the user are brought into contact when he or she grips the ring portion 12 can be adjusted, and the heat generation of the planar heat generating element 14 can be adjusted so as to match the user's way of gripping, thereby making it possible to enhance the use feeling in the user when he or she grips thereon. In addition, since the density of linear heaters 17 is made sparse at the outermost circumferential portion of the ring portion 12, the concern that the external appearance and touching feeling are deteriorated is eliminated further.

Additionally, the linear heater 17 of the heat generating portion is turned repeatedly along the circumferential direction to form the heat generating portion, the curvature of the linear heater 17 is increased, and the linear heater 17 is hardly raised to the surface of the covering material 15 which is disposed to cover the planar heat generating element 14 by such an extent that the curvature is increased, thereby making it possible to enhance the touching feeling and external appearance.

Furthermore, although when the planar heat generating element 14 is assembled to the ring portion 12, the planar heat generating element 14 is assembled to the ring portion 12 while being slightly stretched so as not to generate wrinkles and/or looseness on the surface of the covering material 15, since the linear heater 17 of the planar heat generating element 14 is disposed so as to be turned repeatedly along the circumferential direction of the ring portion 12 and the linear heater 17 is wired in the substantially wavy manner, the curvature of the linear heater 17 is increased, and the linear heater 17 is hardly raised to the surface of the covering material 15 which is disposed to cover the planar heat generating element 14 by such an extent that the curvature is increased, thereby making it possible to enhance the touching feeling and external appearance. In addition, when stretching the planar heat generating element 14, the substantially wavy portions of the linear heater 17 follow the stretching of the planar heat generating element 14, and a concern that the linear heater 17 is damaged by such stretching is eliminated by such an extent that the substantially wavy portions follow the stretching of the planar heat generating element 14.

Note that in the embodiment, while the planar heat generating element 14 is disposed on the ring portion 12 so as to extend between vicinities of the ring portion 12 to which the two pairs of spoke portions 13 which are disposed substantially symmetrically and spaced apart in the left and right direction are connected to the ring portion 12, the planar heating element 14 may be disposed along the full circumference of the ring portion 12, and the configurations of the other constituent portions may take any forms provided that they fall within a range in which the object of the invention can be attained.

(Embodiment 2)

Figure 5:
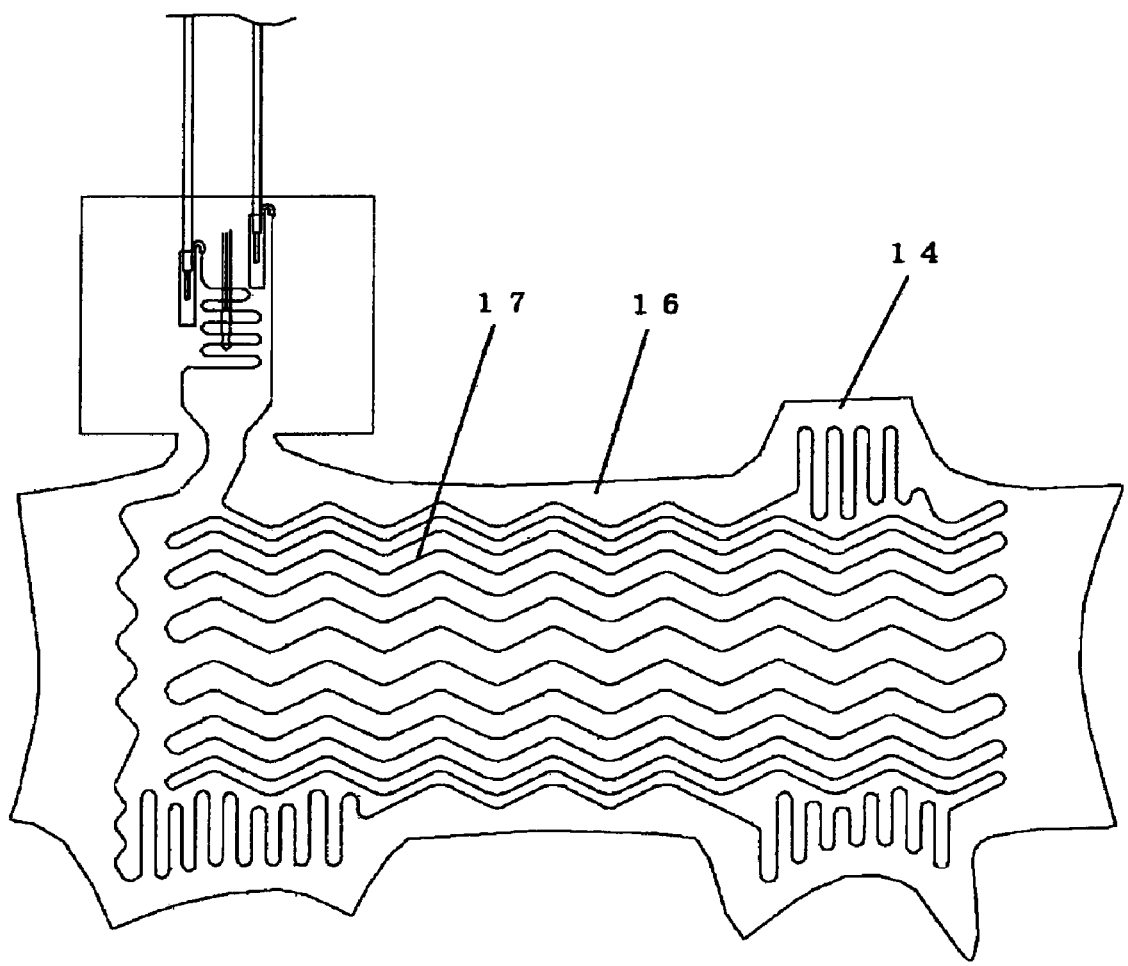
FIG. 5 is a plan view of a planar heat generating element of Embodiment 2 of the invention.
Figure 6:
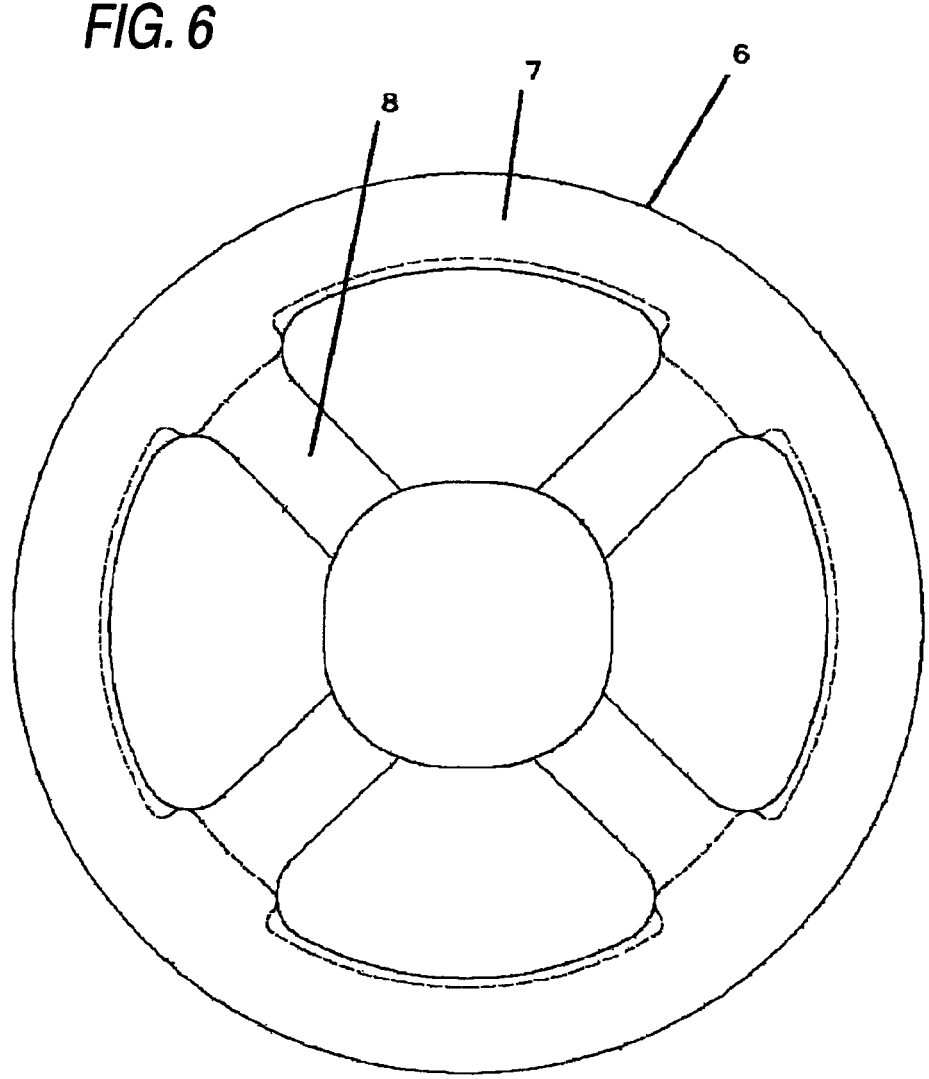
FIG. 6 is a plan view of a conventional steering wheel.
Figure 7:
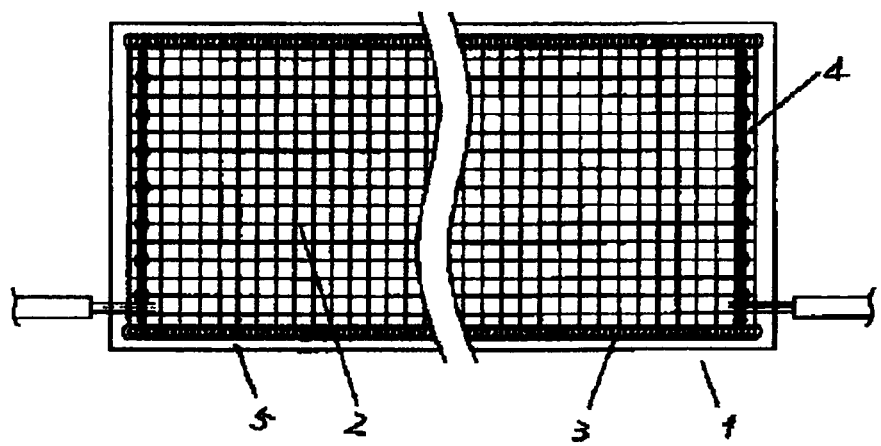
FIG. 7 is a plan view of a conventional planar heat generating element.

FIG. 5 is a plan view of a steering wheel planar heat generating element according to Embodiment 2 of the invention.

A planar heat generating element 14 is provided with a substrate 16 of a nonwoven fabric and a linear heater 17 which is disposed on the substrate 16, and the basic configuration of this embodiment is similar to that of Embodiment 1. What is different from Embodiment 1 is that a turning pitch of the linear heater 17 is made to change gradually from an outermost circumferential portion towards an innermost circumferential portion and that the pitch at the outermost circumferential portion of the ring portion with which more portions of the hands of the user are brought into contact is made largest and the pitch at the innermost circumferential portion with which fewer portions of the hands of the user are brought into contact is made smallest.

Here, when the user grips the steering wheel, the palms are brought into contact with the outermost circumferential portion, and the finger tips are brought into contact with the innermost circumferential portion. In addition, the area where the hand of the user is brought into contact with the steering wheel is gradually reduced from the outermost circumferential portion to the innermost circumferential portion.

Normally, as the sensation of warmness of the human being, although the temperature is the same, a portion whose heated area is large is felt warmer than a portion whose heated area is small. Furthermore, since the flow rate of blood at the finger tip which is a distal end of the human body is small, the finger tip tends to sense easily coldness, and therefore, it becomes comfortable to increase the heating amount at the finger tips larger than at the palm.

Then, as with the embodiment, by changing the turning pitch of the linear heater 17 gradually from the outermost circumferential portion towards the innermost circumferential portion and making the pitch at the outermost circumferential portion of the ring portion with which more portions of the hands of the user are brought into contact largest and the pitch at the innermost circumferential portion to which fewer portions of the hands of the user are brought into contact smallest, the sensation of warmness felt by the user can be made more uniform. In addition, since the heaters are dense at the innermost circumferential portion to which the finger tips are brought into contact, the heating amount becomes larger than at the portion to which the palm is brought into contact, thereby making it possible to enhance comfortableness.

While the invention has been described in detail and by reference to the specific embodiments, it is obvious to those skilled in the art to which the invention pertains that the invention can be changed or modified variously without departing from the spirit and scope thereof.

This patent application is based on Japanese Patent Application No. 2006-94018 filed on Mar. 30, 2006 and Japanese Patent Application No. 2007-11010 filed on Jan. 22, 2007, and the contents thereof are incorporated in their entireties herein by reference.

(Industrial Applicability)

Thus, as has been described heretofore, since the invention is such that the temperature of the planar heat generating element attached to the steering wheel can be adjusted so as to enhance the use feeling by the user when he or she grips thereon, the invention can be applied as a heating heater to steering wheels of automotive vehicles and motorboats and other steering wheel-like appliances which need to be heated.

The invention claimed is:

1. A steering wheel planar heat generating element comprising:
    a steering wheel provided with a ring portion having a grip portion and a spoke portion connected to a steering shaft,
    a planar heat generating element disposed at least on the grip portion in the ring portion including a substrate and a linear heater disposed on the substrate, and a covering material to cover the planar heat generating element,
    wherein the linear heater of the planar heat generating element is disposed so as to be turned repeatedly along a circumferential direction of the ring portion,
    the linear heater is disposed such that a density of turns of the linear heater becomes sparse at an outermost circumferential portion of the ring portion, and
    a turning pitch of the linear heater at an outer circumferential portion of the ring portion is relatively large and the turning pitch of the linear heater at an inner circumferential portion is relatively small.

2. A steering wheel planar heat generating element as set forth in claim 1, wherein the outermost circumferential portion of the ring portion is disposed so as to be positioned substantially in a center of the planar heat generating element when the planar heat generating element is unrolled to spread, and wherein the density of turns of the linear heater positioned substantially in the center of the planar heat generating element becomes sparse.

3. A steering wheel planar heat generating element comprising:
    a steering wheel provided with a ring portion having a grip portion and a spoke portion connected to a steering shaft,
    a planar heat generating element disposed at least on the grip portion in the ring portion including a substrate and a linear heater disposed on the substrate, and a covering material to cover the planar heat generating element,
    wherein the linear heater of the planar heat generating element is disposed so as to be turned repeatedly along a circumferential direction of the ring portion,
    the linear heater is disposed such that a density of turns of the linear heater becomes sparse at an outermost circumferential portion of the ring portion, and
    wherein a turning pitch of the linear heater is made to change gradually from the outermost circumferential portion towards an innermost circumferential portion of the ring portion, and wherein the turning pitch at the outermost circumferential portion of the ring portion is made largest and the turning pitch at the innermost circumferential portion is made smallest.

4. A steering wheel planar heat generating element as set forth in claim 1, wherein the linear heater is disposed so as to be turned repeatedly along the circumferential direction of the ring portion, and wherein the linear heater is wired in a substantially wavy manner.

* * * * *